(12) United States Patent
    Gantzke et al.

(10) Patent No.: US 12,607,454 B2
(45) Date of Patent: Apr. 21, 2026

(54) DEVICE AND METHOD FOR CAPTURING THE SURFACE OF A ROTATION BODY FOR A PRINTING PRESS

(71) Applicant: Heidelberger Druckmaschinen AG, Heidelberg (DE)

(72) Inventors: Witold Gantzke, Munich (DE); Andreas Böttger, Heidelberg (DE); Andreas Poyer, Weiden (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 19/092,110

(22) Filed: Mar. 27, 2025

(65) Prior Publication Data

US 2025/0305814 A1      Oct. 2, 2025

(30) Foreign Application Priority Data

Mar. 27, 2024    (DE) .................... 10 2024 108 721.8

(51) Int. Cl.
    *G01B 11/06*      (2006.01)
    *B41F 33/00*      (2006.01)
    *G06T 7/521*      (2017.01)
    *H04N 23/56*      (2023.01)

(52) U.S. Cl.
    CPC ...... *G01B 11/0608* (2013.01); *B41F 33/0027* (2013.01); *G06T 7/521* (2017.01); *H04N 23/56* (2023.01)

(58) Field of Classification Search
    None
    See application file for complete search history.

(56) References Cited

U.S. PATENT DOCUMENTS 3,907,438 A * 9/1975 Holeman ............... G01B 11/30
                                                356/601
6,415,208 B1 * 7/2002 Pojda ....................... B61K 9/08
                                                701/19
6,822,590 B2 * 11/2004 Kusaka ............... B41F 33/0036
                                                341/104

(Continued)

FOREIGN PATENT DOCUMENTS

DE        10160297 A1    6/2003
DE     102004049879 A1   4/2006
DE     102020111341 A1   11/2020

*Primary Examiner* — Mohammad J Rahman
(74) *Attorney, Agent, or Firm* — Laurence A. Greenberg; Werner H. Stemer; Ralph E. Locher

(57)                ABSTRACT

A device and a method for capturing the surface of a rotation body for a printing press, being a cylinder, a roller, a sleeve for a cylinder or roller, or a sleeve for a cylinder or roller having a printing form, include a motor rotating the body around an axial axis, a light source illuminating an area of the surface using optical light, and an optical camera capturing the illuminated area. An optical apparatus guides the light of first and second partial beams to an image sensor of the camera. The first partial beam tangentially strikes or touches the surface at a first point, then reaches the camera, and the second partial beam radially strikes the surface at a different second point, then reaches the camera. Rapid and precise measurements or types of measurements are performed simultaneously or using the same measures, for example in mounters for flexographic printing plates.

17 Claims, 3 Drawing Sheets

(56) References Cited

U.S. PATENT DOCUMENTS

| | | | |
|---|---|---|---|
| 2006/0081266 | A1 | 4/2006 | Schroder |
| 2007/0037102 | A1* | 2/2007 | Mowry .................... G03C 7/22 |
| | | | 430/495.1 |
| 2019/0048266 | A1* | 2/2019 | Masten, Jr. ............. C10B 53/00 |
| 2019/0323937 | A1* | 10/2019 | Höbel ................ G01N 15/0227 |
| 2020/0353742 | A1 | 11/2020 | Schwab |
| 2021/0237199 | A1* | 8/2021 | Boegli ................. B23K 26/067 |
| 2024/0059020 | A1* | 2/2024 | Milshtein ................ B22F 12/63 |
| 2024/0066599 | A1* | 2/2024 | Korepanov ............. B22F 10/28 |

* cited by examiner

DEVICE AND METHOD FOR CAPTURING THE SURFACE OF A ROTATION BODY FOR A PRINTING PRESS

CROSS-REFERENCE TO RELATED APPLICATION

This application claims the priority, under 35 U.S.C. § 119, of German Patent Application DE 10 2024 108 721.8, filed Mar. 27, 2024; the prior application is herewith incorporated by reference in its entirety.

FIELD AND BACKGROUND OF THE INVENTION

The invention relates to a device for capturing the surface of a rotation body for a printing press, wherein the rotation body is a cylinder, a roller, a sleeve for a cylinder or for a roller, or a sleeve for a cylinder or for a roller having at least one printing form disposed on the sleeve, having a motor for rotating the rotation body around an axial axis of rotation, at least one light source which illuminates at least one area of the surface using optical light, and at least one optical camera for capturing at least the illuminated area of the surface.

The invention also relates to a method for capturing the surface of a rotation body for a printing press, wherein the rotation body is a cylinder, a roller, a sleeve for a cylinder or for a roller, or a sleeve for a cylinder or for a roller having at least one printing form disposed on the sleeve, wherein a motor rotates the rotation body around an axial axis of rotation, at least one light source illuminates at least one area of the surface using optical light and at least one optical camera captures at least the illuminated area of the surface.

The invention is in the technical area of the graphic industry and therein in particular in the area of measuring rotation bodies, e.g., cylinders, rollers, sleeves, preferably flexographic printing sleeves, or plates, preferably flexographic printing plates. During the measurement, for example, protrusions of the rotation body are captured. The invention is therefore also in particular in the field of flexographic printing, thus operating a flexographic printing press, i.e. a rotation printing press for printing using flexographic printing forms; and operating the peripheral devices thereof, in particular a so-called mounter, in which multiple flexographic printing forms are disposed on a cylinder or on a cylinder sleeve depending on the print job. The invention is especially in the subsector here of exactly measuring "mounted" flexographic printing forms, for example, directly in the mounter.

DESCRIPTION OF THE RELATED ART

Measuring, for example, mounted flexographic printing plates, i.e. which are already adhesively bonded on a sleeve for later printing, or the surfaces thereof is already known.

German Patent Application DE 10 2020 111 341 A1, corresponding to U.S. Publication No. 2020/0353742 A1, discloses a device for measuring protrusions of the surface of a rotation body formed as a cylinder, roller, sleeve, or plate of a printing press, for example, a flexographic printing plate, having a first motor for rotating the rotation body around an axis of rotation and having a measuring unit, which is distinguished in that the measuring unit includes at least one light source and at least one surface camera for contactless measurement.

U.S. Pat. No. 3,907,438 A discloses a system for capturing the contour of a cylinder. A beam splitter is used therein for generating two partial beams and a point of the cylinder to be captured is tangentially illuminated from different directions by each of the two partial beams.

Therefore, systems for measuring are known. However, the market continuously demands innovations, in particular to be able to produce printed products of even higher quality even faster and more cost-effectively. The known systems cannot always meet that demand in its entirety.

SUMMARY OF THE INVENTION

It is accordingly an object of the invention to provide an improved device and method for capturing the surface of a rotation body for a printing press, which overcomes the hereinafore-mentioned disadvantages of the heretofore-known devices and methods of this general type and which enables rapid and precise measuring to be carried out, in particular various types of measuring to be carried out simultaneously and/or using the same measures.

ACHIEVEMENT OF THE OBJECT ACCORDING TO THE INVENTION

With the foregoing and other objects in view there is provided, in accordance with the invention, a device for capturing the surface of a rotation body for a printing press, wherein the rotation body is a) a cylinder, b) a roller, c) a sleeve for a cylinder or for a roller, or d) a sleeve for a cylinder or for a roller having at least one printing form disposed on the sleeve, including a motor for rotating the rotation body around an axial axis of rotation, at least one light source which illuminates at least one area of the surface using optical light, at least one optical camera for capturing at least the illuminated area of the surface, an optical apparatus which guides the light of two partial beams, i.e. of a first partial beam and a second partial beam, to an image sensor of the camera, the first partial beam tangentially strikes or touches the surface at a first point and then reaches the camera, and the second partial beam strikes the surface radially at a second point—different from the first point—and then reaches the camera.

With the objects of the invention in view, there is also provided a method for capturing the surface of a rotation body for a printing press, wherein the rotation body is a) a cylinder, b) a roller, c) a sleeve for a cylinder or for a roller, or d) a sleeve for a cylinder or for a roller having at least one printing form disposed on the sleeve, wherein a motor drives the rotation body around an axial axis of rotation, at least one light source illuminates at least one area of the surface using optical light, at least one optical camera captures at least the illuminated area of the surface, and an optical apparatus guides the light of two partial beams, i.e. of a first partial beam and a second partial beam, to the camera such that simultaneously a first point of the surface is captured tangentially and a second point of the surface is captured radially.

Advantageous and therefore preferred refinements of the invention result from the dependent claims and also from the description and the drawings.

Advantageous Configurations and Effects of the Invention

The invention (as a device and/or as a method) advantageously enables a rapid and precise measurement to be carried out, in particular different types of measurement to be carried out simultaneously and/or using the same measures. The invention is used, for example, in mounters for flexographic printing plates.

The invention advantageously enables measuring time to be saved during the measurement of a (rotating) object, for example, a flexographic printing form mounted on a sleeve, since two different, preferably optical measurements can be carried out simultaneously or close to one another in time or in parallel: a tangential measurement (of the relief of the surface) in the shading method or transmitted light method and a radial measurement (of the surface) in the incident light method. The camera used does not have to be moved in this case (except for possibly in the axial direction if multiple cameras are not disposed in the axial direction), which saves time. Its focus also does not have to be changed, which also saves time. The mirror or mirrors used also does/do not have to be moved (except for possibly in the axial direction), which also saves time. A further advantage results from the compact construction which is now possible, since the same camera and/or the same optical apparatus can be used for both measurements.

REFINEMENTS OF THE INVENTION

Preferred refinements of the invention as a device (in short: refinements) are described hereinafter. These can also be combined with one another—where it is not technically excluded.

One refinement can be distinguished in that a first optical path of the length L1 from the first point to the camera and a second optical path of the length L2 from the second point to the camera have the same length, i.e. L1=L2. In this way, a focus setting or change can be prevented (only a single initial focus setting is required). It can actually be the case that L1 and L2 deviate from one another insignificantly, for example, that L2 is insignificantly less than L1; this deviation is then only in the range of the optical tolerance, i.e. still in the focus of the camera, so that a focus change is not required.

One refinement can be distinguished in that the optical apparatus deflects, for example, reflects, the second partial beam. One refinement can be distinguished in that the optical apparatus does not deflect the first partial beam, for example, does not reflect it, but rather transmits it or lets it through. The deflection of the second partial beam can take place by 90°, for example. A semitransparent mirror is preferably used. The optical apparatus could therefore also be referred to as a "beam splitter" if the beam course is observed in reverse from the "viewpoint of the camera," thus the "lines of sight" of the camera are observed.

One refinement can be distinguished in that the optical apparatus includes a first mirror or alternatively a first prism. One refinement can be distinguished in that the first mirror is a semitransparent mirror. One refinement can be distinguished in that the first mirror is a polarizing mirror. One refinement can be distinguished in that the optical apparatus includes a second mirror or alternatively a second prism.

One refinement can be distinguished in that the camera is disposed movably. One refinement can be distinguished in that the optical apparatus is disposed movably. One refinement can be distinguished in that the optical apparatus is disposed movably jointly with the camera. In this manner, the device can be adapted if rotation bodies having different radii have to be measured. The movement preferably takes place in a direction which is perpendicular to the tangential direction and to the axial direction of the rotation body.

One refinement can be distinguished in that the light source includes a first light source which generates the first partial beam and the light source includes at least one second light source which generates the second partial beam. One refinement can be distinguished in that at least one light source is present for illuminating the first point. The light of the first light source can be deflected by a mirror and reaches the first (measuring) point of the surface to be measured. One refinement can be distinguished in that at least one second light source is present for illuminating the second point. One refinement can be distinguished in that the first light source is activated alternately with the second light source. The two images generated in succession on the same image sensor in this way can be evaluated separately by applying image processing; the evaluation can preferably take place in succession.

One refinement can be distinguished in that the second mirror or the second prism deflects the second partial beam before it reaches the first mirror or the first prism.

One refinement can be distinguished in that the first mirror or the first prism is only disposed in a section of the field of view of the camera (with respect to the cross section of the field of view), for example, in one half of the field of view. In this way, the light of the radial measurement and the light of the tangential measurement can reach the camera or its image sensor simultaneously. Preferably, the first and the second light source are activated simultaneously for this purpose. One refinement can be distinguished in that the first partial beam is guided past the first mirror and the second partial beam is guided toward the first mirror and is deflected thereby. One refinement can be distinguished in that the first partial beam reaches a first section of the image sensor and the second partial beam reaches a second section of the image sensor. The two images generated simultaneously and preferably adjacent to one another on the image sensor in this way can be evaluated separately by using image processing; the evaluation can preferably take place simultaneously. The two sections are preferably located directly adjacent to one another.

One refinement can be distinguished in that the first mirror or the first prism is located during the (tangential) measurement at the first point outside the beam path between the first point and the camera, and the first mirror or the first prism is located during the (radial) measurement at the second point inside the beam path between the second point and the camera. It can preferably be provided that the first mirror is made non-semitransparent and movable/positionable and instead is moved away (preferably pivoted or moved linearly) from the field of view of the camera or from the first and second partial beam for the tangential measurement and then is moved back into position or into the field of view or into the first and second partial beam for the radial measurement. In this way, only one partial beam always reaches the camera. The camera preferably remains at one location during the two measurements in this solution, i.e. it is not moved. This procedure requires more time than the procedure according to the invention with the parallel measurement, however; in comparison to the serial measurement, approximately the same time is required.

Preferred refinements of the method (in short: refinements) are described hereinafter. These can also be combined with one another—where it is not technically precluded.

One refinement can be distinguished in that information on the local height of the surface is captured using the first partial beam. One refinement can be distinguished in that the surface is completely acquired such that a complete height profile of the surface is created by computing. One refinement can be distinguished in that information on the local presence of printing and nonprinting points of the surface is captured using the second partial beam. One refinement can be distinguished in that the surface is completely captured such that a complete printing profile of the surface is created by computing.

The features and combinations of features disclosed in the above sections technical area, invention, and refinements and in the following section exemplary embodiments represent—in any combination with one another—further advantageous refinements of the invention.

Other features which are considered as characteristic for the invention are set forth in the appended claims.

Although the invention is illustrated and described herein as embodied in a device and a method for capturing the surface of a rotation body for a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
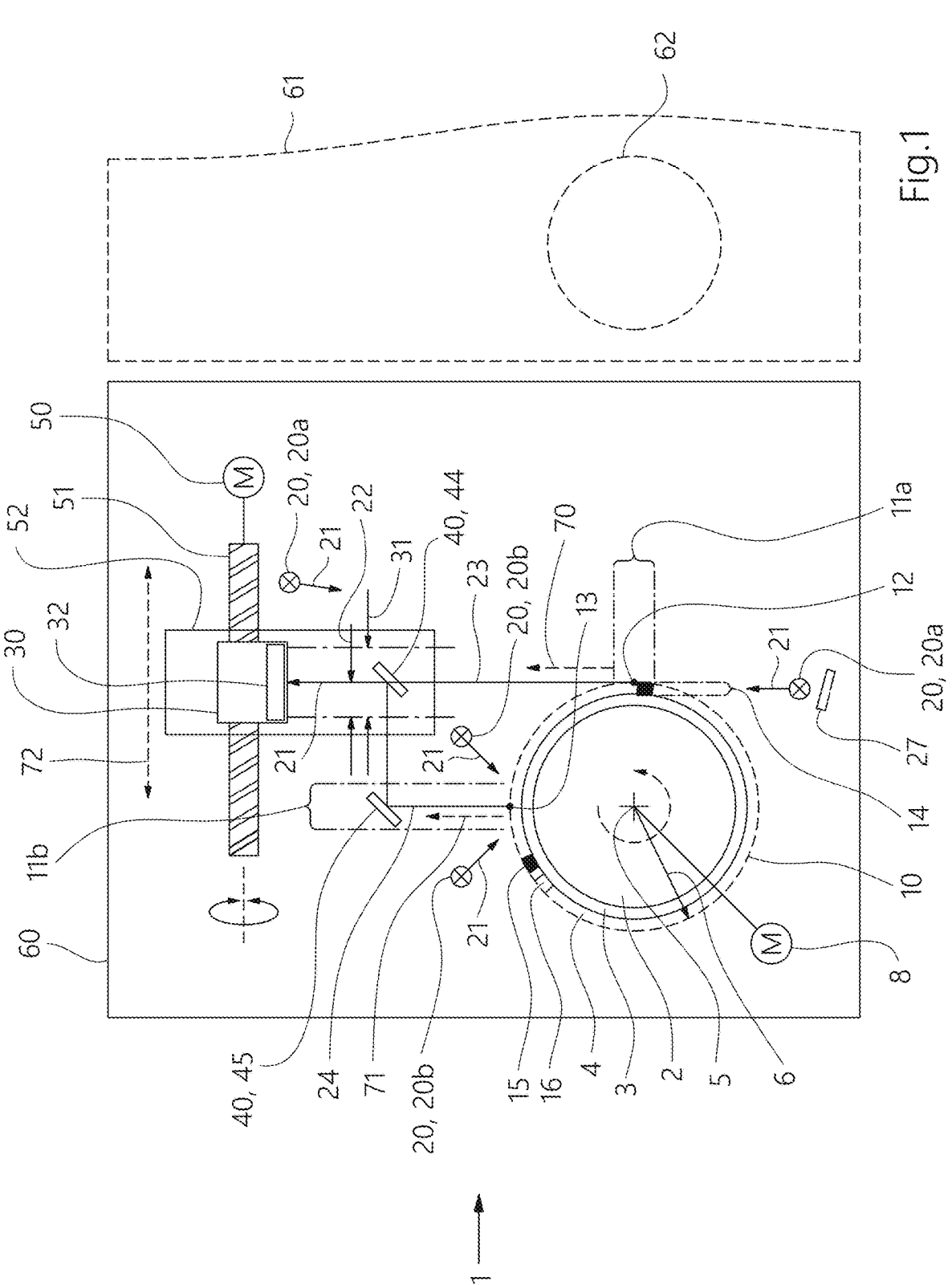
FIGS. 1 to 3 are fragmentary, diagrammatic, vertical-sectional views of preferred exemplary embodiments of the invention and the refinements thereof.
Figure 2:
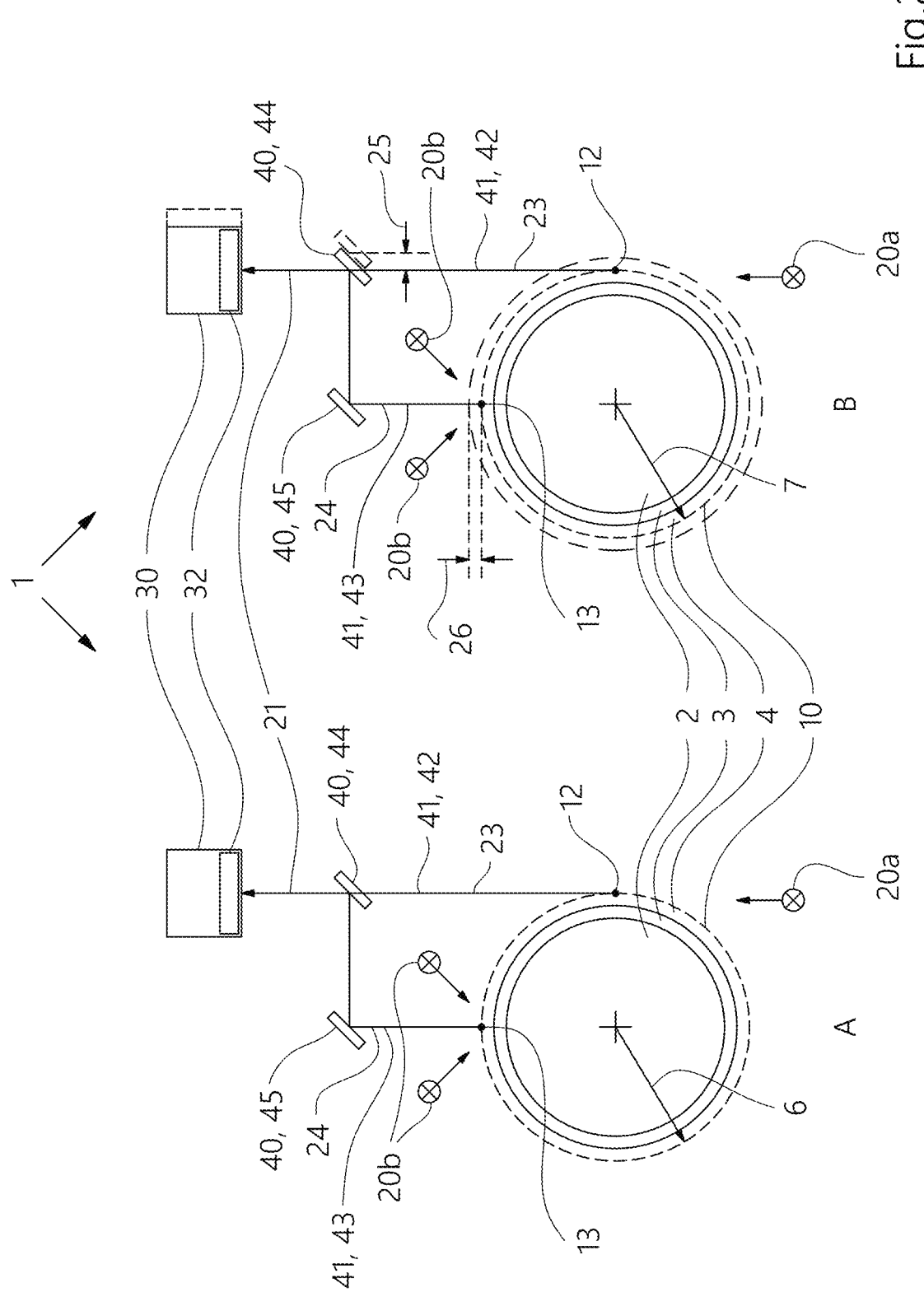
Figure 3:
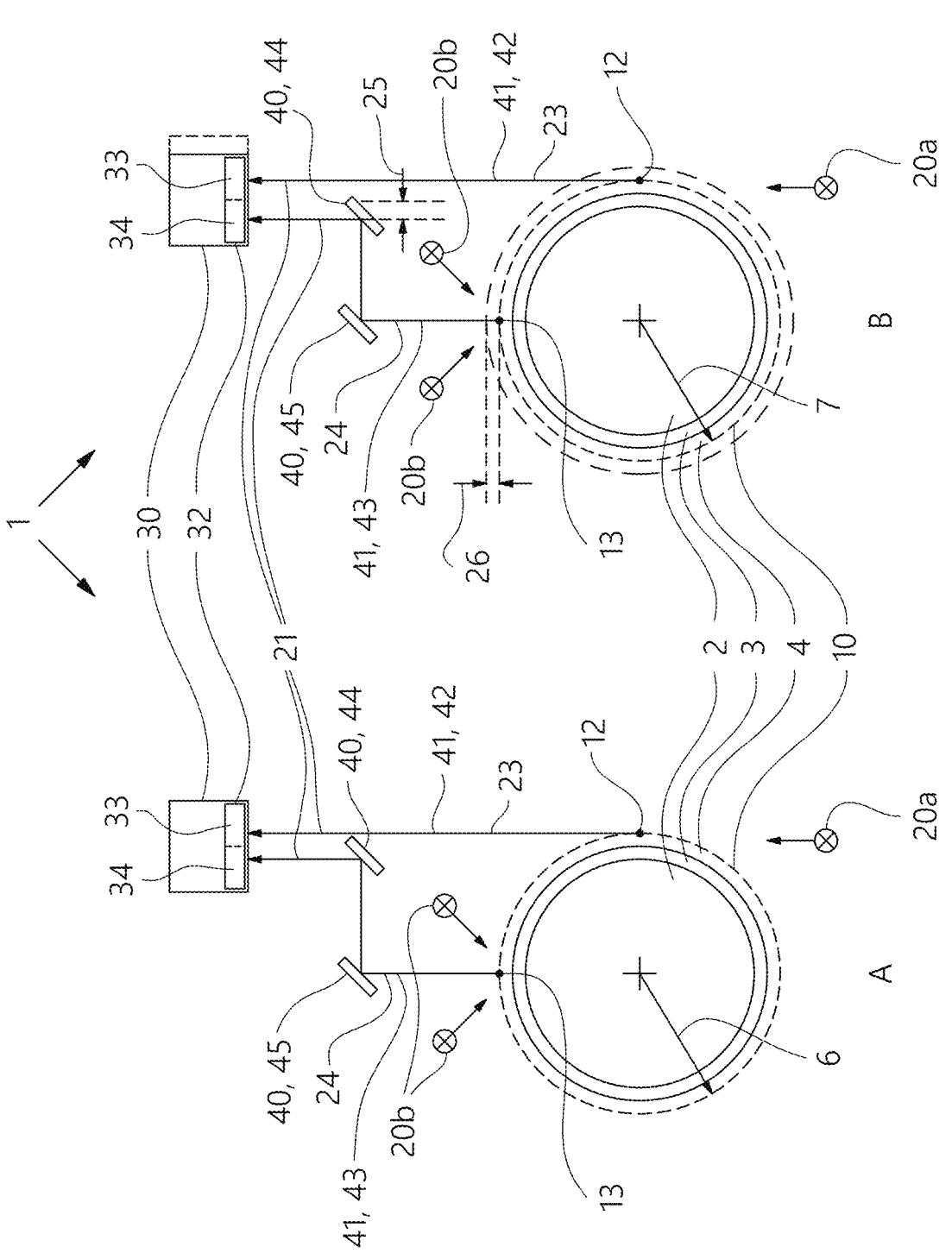

Referring now in detail to FIGS. 1-3 of the drawings, in which features corresponding to one another are provided with the same reference signs and in which repeating reference signs were partially omitted for clarity, there are seen diagrammatic representations of sectional views of preferred exemplary embodiments of the device according to the invention when carrying out the method according to the invention; FIGS. 2 and 3 show simplified representations.

FIG. 1 shows a device 1. This device 1 is used for measuring a rotatable rotation body 2, in particular a measurement cylinder having a pushed-on sleeve 3 and printing form(s) 4 mounted thereon. The rotation takes place around an axis of rotation 5 (which defines the axial direction mentioned in this application). The printing form 4 has a radius 6, wherein it can be seen upon viewing FIG. 2 and FIG. 3 that the radius can vary during successive measurements (radius 6 and deviating radius 7). The rotation is carried out by a drive, in particular a motor 8.

The rotation body 2, which is the printing form 4 in this case, includes a surface 10. Two areas 11a and 11b of this surface are to be measured simultaneously or at least closely in time, wherein the areas "travel" over the surface due to the rotation. A first point 12 to be measured is located in the area 11a; a second point 13 to be measured is located in the area 11b. The two points 12 and 13 can extend in the axial direction, i.e. can be measurement lines. The local height 14 of the surface 10 is to be measured at the point 12. It is to be detected by the measurement at the point 13 whether it includes printing points 15 or nonprinting points 16.

The illumination is performed using at least one light source 20. This light source 20 emits light 21, which is optically captured. An optical camera 30 having a field of view 31 is used. The camera 30 includes at least one optical chip 32. In the case of the tangential measurement (see below), the illumination either takes place by using a first light source 20a (from "above") via a mirror 27 or alternatively by using a first light source 20a (from "below") without a mirror. In the case of the radial measurement (see below), it takes place using the two second light sources 20b, wherein the latter are preferably activated alternately and thus generate changing illumination scenarios and thus shadows for the capture and evaluation. The light of the first light source 20a reaches the camera 30 via a first optical path 23; the light of a second light source 20b via a second optical path 24.

The camera 30 is disposed movably for measuring various printing forms 4. The drive of the movement takes place via a second motor 50 and a spindle 51. The camera is preferably disposed in this case on a carrier 52, which can be moved back and forth in a direction 72 during rotation of the spindle 51.

The device 1 includes an optical apparatus 40, which has a first mirror 44 and a second mirror 45 according to the illustrated embodiment. The first mirror 44 is preferably disposed—like the camera 30—on the carrier 52 and is therefore movable jointly with the camera 30 in the direction 72. The second mirror 45 is preferably disposed so as to be fixed in place.

The device 1 can be part of a measuring device 60, for example, of a so-called mounter. The device 1 is used according to the invention to carry out a measurement of at least one printing form 4 in the tangential direction 70 and simultaneously, or at least closely in time, a measurement in the radial direction 71. The printing form 4 thus measured can then be used in a printing press 61 on a cylinder 62 for printing, preferably together with the sleeve 3.

FIG. 2 shows the same device 1, once during the measurement of a printing form 4 having a first radius 6 (illustration A) and once during the measurement of a printing form 4 having a deviating, in particular lesser second radius 7 (illustration B): printing forms having larger radii are also measurable accordingly.

In illustration A, light 21 for the tangential measurement reaches the first point 12 and from there through the semi-transparent first mirror 44 (un-reflected) to the camera 30 or to the image sensor 32; light 21 for the radial measurement also reaches the second point 13 and from there reflected in each case on the second mirror 45 and on the semitransparent first mirror 44 to the camera 30. In illustration B, it can be seen—due to the comparative, dotted illustration of the camera 30 and the first mirror 44—that the camera 30 having its image sensor 32 and together with the first mirror 44 was moved slightly (to the left) and therefore positioned. In this way, a printing form 4 having a lesser second radius 7 or its surface 10 can be measured. The first optical path 23 from the first point 12 to the camera 30 and the second optical path 24 from the second point 13 to the camera 30 each remain equal in length during the repositioning of the camera 30. The first path length change 25 (decrease) in the second partial beam 43 and the second path length change 26 (increase) in the second partial beam 43 compensate one another in this case. For the measurement, the first light source 20a is activated alternately with the two second light sources 20b. (Measurement) light 21 of the first (measurement) point 12 and the second (measurement) point 13 thus alternately reach the image sensor 32. The evaluation of the image sensor 32 or the recorded images therefore also preferably takes place alternately.

Alternatively, the first mirror 44 can be non-semitransparent and movable, for example, horizontally, and can be moved out of the beam path 21 for the tangential measurement of the first point 12 and can be moved into the beam path 21 for the radial measurement of the second point 13.

FIG. 3 shows a similar device 1 once during the measurement of a printing form 4 or its surface 10 having a first radius 6 (illustration A) and once during the measurement of a printing form 4 having a deviating, in particular lesser second radius 7 (illustration B). The structure is substantially identical to the structure in FIG. 2. However, it can be seen that the image sensor 32 is divided into a first section 33 and a second section 34. This division is preferably not of a physical nature, but rather is only implemented in the evaluation of the data of the image sensor 32. The first mirror 44 is only located in the beam path of the second optical path 24, but not in the beam path of the first optical path 23 (in comparison to FIG. 1, the mirror 44 is only positioned in a section 22—restricted to the second section 34—of the camera field of view). Otherwise, the measurement takes place in the same manner as shown in FIG. 2 and as can be seen from the two illustrations A and B of FIG. 3 in comparison with one another: the camera 30 and its image sensor 32 having the two sections 33 and 34 is moved in the direction 72 and positioned for the measurement, wherein the first optical path 23 and the second optical path 24 again remain equal in length. The light sources 20*a* and 20*b* are preferably activated simultaneously: the tangential measurement is performed using the first image sensor section 33; the radial measurement is performed simultaneously using the second image sensor section 34.

The following is a summary list of reference numerals and the corresponding structure used in the above description of the invention:

1 device
2 rotation body, in particular measurement cylinder having sleeve and printing form(s)
3 sleeve
4 printing form
5 axis of rotation
6 first radius
7 second radius
8 first motor (rotation of the rotation body)
10 surface
11*a* area of the surface
11*b* area of the surface
12 first point of the surface
13 second point of the surface
14 local height of the surface
15 printing point
16 nonprinting point
20 light source
20*a* first light source
20*b* second light source
21 light or beam path of the light
22 section of the camera field of view
23 first optical path
24 second optical path
25 first path length change
26 second path length change
27 mirror
30 camera
31 field of view
32 image sensor
33 first section 34 second section
40 optical apparatus
41 partial beams
42 first partial beam
43 second partial beam
44 first mirror, alternatively first prism
45 second mirror, alternatively second prism
50 second motor (translation of the camera and the mirror)
51 spindle
52 carrier for camera and mirror
60 measuring device, in particular mounter
61 printing press
62 rotation body
70 tangential direction
71 radial direction
72 movement direction

The invention claimed is:

1. A device for capturing the surface of a rotation body for a printing press, the rotation body being a) a cylinder, b) a roller, c) a sleeve for a cylinder or for a roller, or d) a sleeve for a cylinder or for a roller having at least one printing form disposed on the sleeve,
   a motor for rotating the rotation body around an axial axis of roatation;
   at least one light source illuminating at least one area of the surface using ptical light;
   at least one optical camera for capturing at least the one illuminated area of the surface, said at least one optical camera having an image sensor;
   an optical apparatus guiding light of two partial beams, including a first partial beam and a second partial beam, to said image sensor;
   said first partial beam tangentially striking or touching the surface at a first point and then reaching said at least one optical camera, and
   said second partial beam radially striking the surface at a second point, being different than said first point, and then reaching said at least one optical camera.

2. The device according to claim 1, which further comprises a first optical path having a length L1 from said first point to at least one optical camera, and a second optical path having a length L2 from said second point to said at least one optical camera, said lengths L1 and L2 being equal to each other.

3. The device according to claim 1, wherein said optical apparatus includes a first mirror or a first prism.

4. The device according to claim 3, wherein said first mirror is a semitransparent mirror.

5. The device according to claim 3, wherein said optical apparatus includes a second mirror or a second prism.

6. The device according to claim 5, wherein said second mirror or said second prism deflects said second partial beam before reaching said first mirror or said first prism.

7. The device according to claim 1, wherein said at least one light source includes a first light source generating said first partial beam, and said at least one light source includes at least one second light source generating said second partial beam.

8. The device according to claim 7, wherein said first light source is activated alternately with said at least one second light source.

9. The device according to claim 3, wherein said at least one optical camera has a field of view with a section, and said first mirror or said first prism is only disposed in said section of said field of view.

10. The device according to claim 9, wherein said first partial beam is guided past said first mirror, and said second partial beam is guided toward and deflected by said first mirror.

11. The device according to claim 9, wherein said image sensor has a first section and a second section, said first partial beam reaches said first section of said image sensor and said second partial beam reaches said second section of said image sensor.

12. The device according to claim 8, which further comprises:

a beam path between said first point and said at least one optical camera, and a beam path between said second point and said at least one optical camera;

said optical apparatus including a first mirror or a first prism;

said first mirror or said first prism being located outside said beam path between said first point and said at least one optical camera during a measurement at said first point; and said first mirror or said first prism being located inside said beam path between said second point and said at least one optical camera during a measurement at said second point.

13. A method for capturing a surface of a rotation body for a printing press, the method comprising:

providing the rotation body being a) a cylinder, b) a roller, c) a sleeve for a cylinder or for a roller, or d) a sleeve for a cylinder or for a roller having at least one printing form disposed on the sleeve;

using a motor to rotate the rotation body around an axial axis of rotation;

using at least one light source to illuminate at least one area of the surface using optical light;

using at least one optical camera to capture at least the at least one illuminated area of the surface; and using an optical apparatus to guide light of two partial beams, including a first partial beam and a second partial beam, to the at least one optical camera, causing a first point of the surface to be captured tangentially and a second point of the surface to be simultaneously captured radially.

14. The method according to claim 13, which further comprises using the first partial beam to capture information on a local height of the surface.

15. The method according to claim 14, which further comprises completely capturing the surface for creating a complete height profile of the surface by computing.

16. The method according to claim 13, which further comprises using the second partial beam to capture information on a local presence of printing and nonprinting points of the surface.

17. The method according to claim 16, which further comprises completely capturing the surface for creating a complete printing profile of the surface by computing.

* * * * *